US012492907B2

(12) United States Patent
Kulkarni et al.

(10) Patent No.: US 12,492,907 B2
(45) Date of Patent: Dec. 9, 2025

(54) OBJECT AIDED LOCALIZATION WITHOUT COMPLETE OBJECT INFORMATION

(71) Applicant: QUALCOMM Incorporated, San Diego, CA (US)

(72) Inventors: Mandar Narsinh Kulkarni, Bridgewater, NJ (US); Muryong Kim, Madison, NJ (US); Jubin Jose, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 18/502,843

(22) Filed: Nov. 6, 2023

(65) Prior Publication Data

US 2024/0219184 A1 Jul. 4, 2024

Related U.S. Application Data

(60) Provisional application No. 63/477,437, filed on Dec. 28, 2022.

(51) Int. Cl.
G01C 21/30 (2006.01)
G06T 7/73 (2017.01)

(52) U.S. Cl.
CPC ........... G01C 21/30 (2013.01); G06T 7/74 (2017.01); G06T 2207/30244 (2013.01); G06T 2207/30252 (2013.01)

(58) Field of Classification Search
CPC ......... G06T 11/00; G06F 16/29; G01C 21/28; G01C 21/3438; G01C 21/3635; G01C 21/3667

See application file for complete search history.

(56) References Cited

U.S. PATENT DOCUMENTS 11,321,879 B2 * 5/2022 Matlack ............... G08G 1/123
11,480,441 B2 * 10/2022 Nemirovsky .......... G06V 20/64
(Continued)

FOREIGN PATENT DOCUMENTS

CN 115391587 A 11/2022
GB 2599947 A 4/2022

OTHER PUBLICATIONS

International Search Report and Written Opinion—PCT/US2023/079011—ISA/EPO—May 29, 2024.
(Continued)

Primary Examiner — Hussein Elchanti
(74) Attorney, Agent, or Firm — QUALCOMM Incorporated

(57) ABSTRACT

Techniques and systems are provided for localization of an apparatus. For instance, a process can include: obtaining a map of an environment, the map including a map point representing an object in the environment; obtaining image data including the object in the environment, wherein the image data is associated with a camera pose; obtaining point information from the obtained image data, the obtained point information describing two or more points of the object in the obtained image data; determining whether to associate the point information with the map point based, at least in part, on a comparison of the map point and an estimated point, wherein the estimated point is estimated based on the camera pose and point information; and based on the determination to associate the point information with the map point, associating the point information with the map point to localize an apparatus.

26 Claims, 12 Drawing Sheets

(56) References Cited

U.S. PATENT DOCUMENTS

| | | | |
|---|---|---|---|
| 2016/0292867 A1 | 10/2016 | Martini | |
| 2018/0191863 A1* | 7/2018 | Matthiesen | H04L 67/12 |
| 2018/0336697 A1 | 11/2018 | Lu et al. | |
| 2019/0171943 A1* | 6/2019 | Pao | G06F 16/29 |
| 2019/0206258 A1* | 7/2019 | Chang | G06T 19/006 |
| 2019/0259182 A1* | 8/2019 | Sarukkai | G06T 7/97 |
| 2020/0103239 A1* | 4/2020 | Schwie | G08G 1/012 |
| 2020/0342626 A1 | 10/2020 | Chen et al. | |
| 2020/0363216 A1* | 11/2020 | Elvanoglu | G06Q 10/02 |
| 2020/0410702 A1 | 12/2020 | Zhang et al. | |
| 2022/0148219 A1 | 5/2022 | Kim et al. | |

OTHER PUBLICATIONS

Alcantarilla P.F., et al., "Learning Visibility of Landmarks for Vision-Based Localization", 2010 IEEE International Conference on Robotics and Automation, ICRA 2010, Anchorage, Alaska, USA, May 3, 2010-May 8, 2010, IEEE, Piscataway, NJ, USA, May 3, 2010, pp. 4881-4888, XP031743318, The Whole Document.

Alcantarilla P.F., et al., "Visibility Learning in Large-Scale Urban Environment", 2011 IEEE International Conference on Robotics and Automation (ICRA), IEEE, Shanghai International Conference Center, Shanghai, China, May 9, 2011-May 13, 2011, May 9, 2011, pp. 6205-6212, XP032033525, The Whole Document.

Partial International Search Report—PCT/US2023/079011—ISA/EPO—Mar. 4, 2024.

* cited by examiner

OBJECT AIDED LOCALIZATION WITHOUT COMPLETE OBJECT INFORMATION

CROSS-REFERENCE TO RELATED APPLICATIONS

This application claims the benefit of U.S. Provisional Application No. 63/477,437, filed Dec. 28, 2022, which is hereby incorporated by reference, in its entirety and for all purposes.

FIELD

The present disclosure generally relates to object aided localization. For example, aspects of the present disclosure are related to systems and techniques for performing object aided localization absent complete object information.

BACKGROUND

Increasingly, systems and devices (e.g., autonomous vehicles, such as autonomous and semi-autonomous cars, drones, mobile robots, mobile devices, extended reality (XR) devices, and other suitable systems or devices) include multiple sensors to gather information about the environment, as well as processing systems to process the information gathered, such as for route planning, navigation, collision avoidance, etc. One example of such a system is an Advanced Driver Assistance System (ADAS) for a vehicle. Sensor data, such as images captured from one or more cameras, may be gathered, transformed, and analyzed to detect objects. Detected objects may be compared to objects indicated on a high-definition (HD) map for localization of the vehicle. Localization may help a vehicle or device determine where on a road the vehicle is travelling. Some cases, such as for merging, exiting, navigating forks in a road, etc., may require more precise location information than available with satellite-based navigation systems. For example, location information, such as those obtained using satellite-based navigation system, may be used to determine a road on which the vehicle is travelling. However, such systems may not be able to precisely locate the vehicle on the road. Localization may be used to determine in which portion of a lane the vehicle is in.

Existing HD maps have partial sign information regarding objects, such as signs, on a side of a road. For example, an HD map may have a single point indicating a sign. In some cases, it may be difficult to match incomplete and possibly inaccurate object information from such HD maps to sensor data captured by sensors of the ego vehicle. Thus, techniques for object aided localization without complete object information may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, an apparatus for localization is provided. The apparatus includes: at least one memory comprising instructions; and at least one processor coupled to the at least one memory. The at least one processor is configured to: obtain a map of an environment, the map including a map point representing an object in the environment; obtain an image including the object in the environment, wherein the image is associated with a camera pose; obtain point information from the obtained image, the obtained point information describing two or more points of the object in the obtained image; determine whether to associate the point information with the map point based, at least in part, on a comparison of the map point and an estimated point, wherein the estimated point is estimated based on the camera pose and point information; and based on the determination to associate the point information with the map point, associate the point information with the map point to localize the apparatus.

In another example, a method for localization is provided. The method includes obtaining a map of an environment, the map including a map point representing an object in the environment; obtaining an image including the object in the environment, wherein the image is associated with a camera pose; obtaining point information from the obtained image, the obtained point information describing two or more points of the object in the obtained image; determining whether to associate the point information with the map point based, at least in part, on a comparison of the map point and an estimated point, wherein the estimated point is estimated based on the camera pose and point information; and based on the determination to associate the point information with the map point, associating the point information with the map point to localize an apparatus.

As another example, a non-transitory computer-readable medium is provided. The non-transitory computer-readable medium has stored thereon instructions that, when executed by at least one processor, cause the at least one processor to: obtain a map of an environment, the map including a map point representing an object in the environment; obtain an image including the object in the environment, wherein the image is associated with a camera pose; obtain point information from the obtained image, the obtained point information describing two or more points of the object in the obtained image; determine whether to associate the point information with the map point based, at least in part, on a comparison of the map point and an estimated point, wherein the estimated point is estimated based on the camera pose and point information; and based on the determination to associate the point information with the map point, associate the point information with the map point to localize an apparatus In another example, an apparatus for localization is provided. The apparatus includes: means for obtaining a map of an environment, the map including a map point representing an object in the environment; means for obtaining an image including the object in the environment, wherein the image is associated with a camera pose; means for obtaining point information from the obtained image, the obtained point information describing two or more points of the object in the obtained image; means for determining whether to associate the point information with the map point based, at least in part, on a comparison of the map point and an estimated point, wherein the estimated point is estimated based on the camera pose and point information; and means for, based on the determination to associate the point information with the map point, associating the point information with the map point to localize an apparatus.

In some aspects, one or more of the apparatuses described herein is, is part of, and/or includes a vehicle or a computing device or component of a vehicle (e.g., an autonomous vehicle), a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1A:
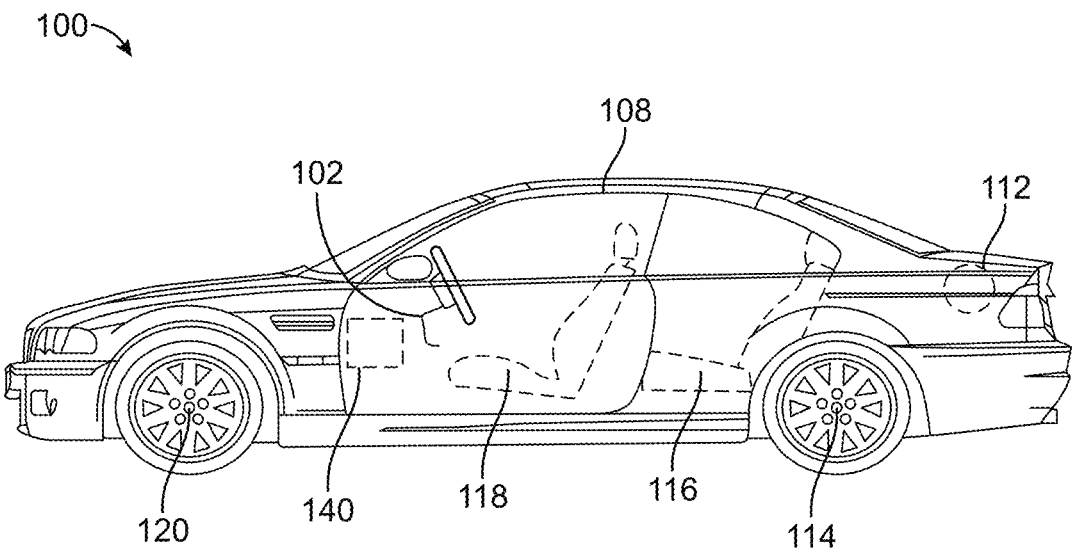
FIGS. 1A and 1B are block diagrams illustrating a vehicle suitable for implementing various techniques described herein, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Object detection may be used to identify objects and the identified objects may be used to determine where a tracking object is located relative to the identified objects. A tracking object may be understood to refer to any system or device capable of precisely locating itself in an environment and locating other objects in the environment. An example of a tracking object is a vehicle (referred to as an ego vehicle). Examples will be described herein using an ego vehicle s as an example of a tracking object. However, other tracking objects can include robotic devices (e.g., an automated vacuum cleaner, an industrial robotic device, etc.), an extended reality (XR) device (e.g., a virtual reality (VR) device, an augmented reality (AR) device, and/or a mixed reality (MR) device).

As noted previously, one or more sensors (e.g., image sensors, such as a camera, range sensors such as radar and/or light detection and ranging (LIDAR) sensors, etc.) of an ego vehicle may be used to obtain information about an environment in which the ego vehicle is located. A processing system of the ego vehicle may be used to process the information for one or more operations, such as localization, route planning, navigation, collision avoidance, among others. For example, in some cases, the sensor data may be obtained from the one or more sensor (e.g., one or more images captured from one or more cameras, depth information captured or determined by one or more radar and/or LIDAR sensors, etc.), transformed, and analyzed to detect objects.

Localization may be used to determine a precise position of an ego vehicle on a map. Localization may be performed based on data input from sensors and a map. For example, location data, such as global navigation satellite system (GNSS) data, global positioning system (GPS) data, or other location data, may be used to identify the location of the ego vehicle within a certain distance (e.g., within a meter, within two meters, etc.). However, this level of accuracy may not be sufficient to precisely place a vehicle in a particular lane of traffic, for example. Localization may be used to more precisely locate the ego vehicle based on a map of the environment. For example, based on a GPS location, the ego vehicle may obtain, such as from a locally or remotely stored map, map information about an area of the environment around the vehicle. In some cases, this map may be an HD map, which may be a highly detailed map which includes multiple layers of information corresponding to information sensors of the vehicle may provide or type of information provided by the layer. For example, an HD map may include a camera-oriented layer which may include images that a camera may capture at a location. The camera-oriented layers may help provide information about features that may be difficult to obtain via other sensors, such as for lane markings. Similarly, the HD map may also include a LIDAR or radar layers which may include, for example, point clouds that a LIDAR or radar sensor may capture at the location. As another example, the HD map may include a non-semantic layer, such as a point cloud, where specific points are not semantically segmented (e.g., labeled) based on what the point represents. The vehicle may compare information provided by sensors of the vehicle to a corresponding HD map layer to precisely locate the vehicle on the map, for example, by triangulating multiple corresponding objects or points.

In some cases, the objects that may be included in HD maps may include objects near a road or other path travelled by the vehicle, such as traffic signs, lights, poles, etc., that may be reliably detected by sensors of a vehicle. These objects useful to provide the longitudinal accuracy in localization, especially when accompanied by an ability to identify certain aspects of the objects, such as to identify corners of traffic sign shape using camera images. Of note, while the focus of the discussion herein is directed to examples involving traffic sign, the techniques discussed herein may be applicable to any objects along a vehicle path. While HD maps include objects near roads, these HD maps may not be completely accurate and may only have partial information about objects. For example, the HD map may only include partial information about an object such as a traffic sign, where the partial information may be a center point of the traffic sign and the orientation of the traffic sign (e.g., which way the sign is facing) may not be provided. Additionally, the information in the HD map may be inaccurate, for example, as signs may wobble due to winds, may be unexpectedly relocated due to an accident, may be tilted due to heavy rains, etc. Thus, a technique for object aided localization without complete object information may be useful.

Systems, apparatuses, electronic devices, methods (also referred to as processes), and computer-readable media (collectively referred to herein as "systems and techniques") are described for estimating a point based on detected points of an object from an image, and projecting a map point for comparison to the estimated point. In one illustrative example, the systems and techniques can estimate a center point based on detected corner points of an object. The systems and techniques can project a map point to allow the map point to be compared to the estimated center point. In some cases, this projection may be performed on an image plane and the map point may be associated with corner points. This association may be performed on the image plane or based on three dimensional coordinates. Certain checks may be performed on this association to ensure accuracy.

The systems and techniques describe herein can be used to improve the localization accuracy for various applications and systems, including autonomous driving, XR systems, robotics, scene understanding, among others.

Various aspects of the application will be described with respect to the figures.

Figure 1B:
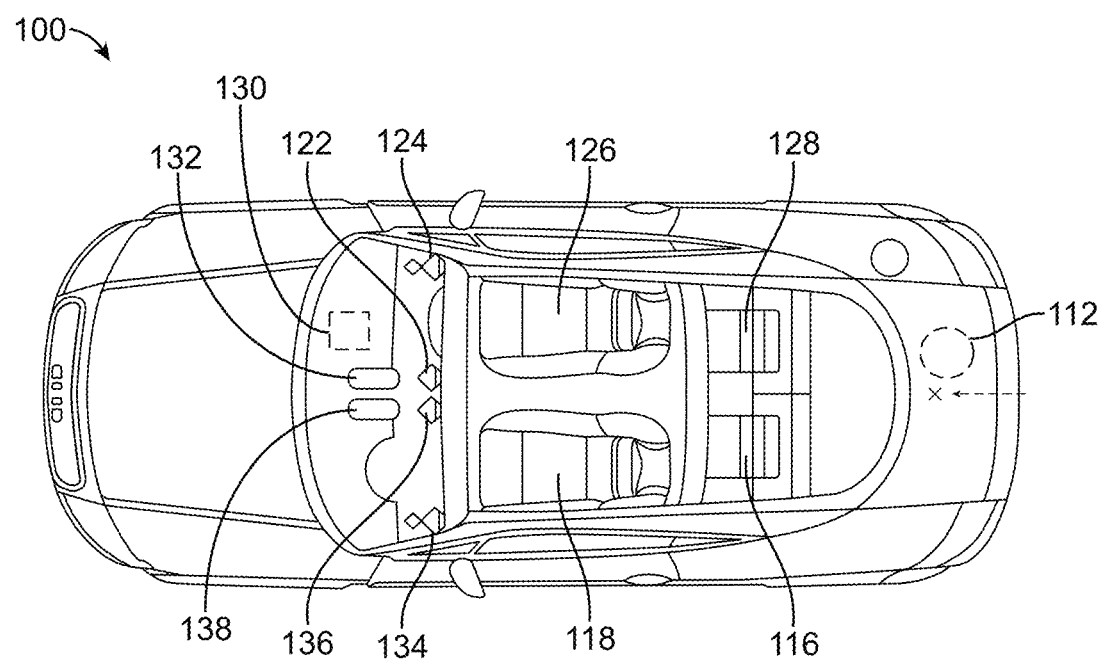

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, cameras 122, 136, microphones 124, 134, impact sensors 130, radar 132, and LIDAR 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, LIDAR 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various aspects using information received from various sensors, particularly the cameras 122, 136, radar 132, and LIDAR 138. In some aspects, the control unit 140 may supplement the processing of camera images using distance and relative position information (e.g., relative bearing angle) that may be obtained from radar 132 and/or LIDAR 138 sensors. The control unit 140 may further be configured to control steering, breaking and speed of the vehicle 100 when operating in an autonomous or semi-autonomous mode using information regarding other vehicles determined using various aspects.

Figure 1C:
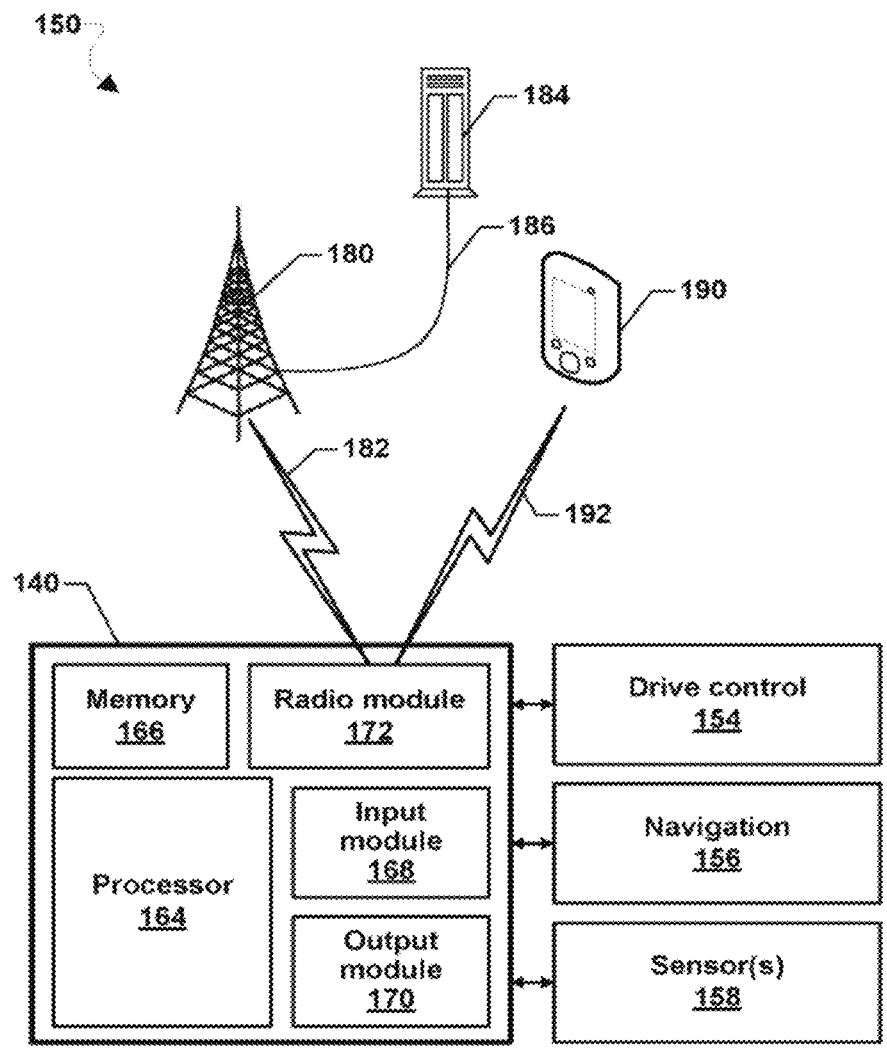
FIG. 1C is a block diagram illustrating components of a vehicle suitable for implementing various techniques described herein, in accordance with aspects of the present disclosure.

FIG. 1C is a component block diagram illustrating a system 150 of components and support systems suitable for implementing various aspects. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various aspects. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some aspects, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various aspects, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described and may be configured to provide a variety of data to the processor 164 and/or the navigation components 156. For example, the control unit 140 may aggregate and/or process data from the sensors 158 to produce information the navigation components 156 may use for localization. As a more specific example, the control unit 140 may process images from multiple camera sensors to generate a single semantically segmented image for the navigation components 156. As another example, the control unit 140 may generate a fused point clouds from LIDAR and radar data for the navigation components 156.

While the control unit 140 is described as including separate components, in some aspects some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various aspects when installed into a vehicle.

Figure 1D:
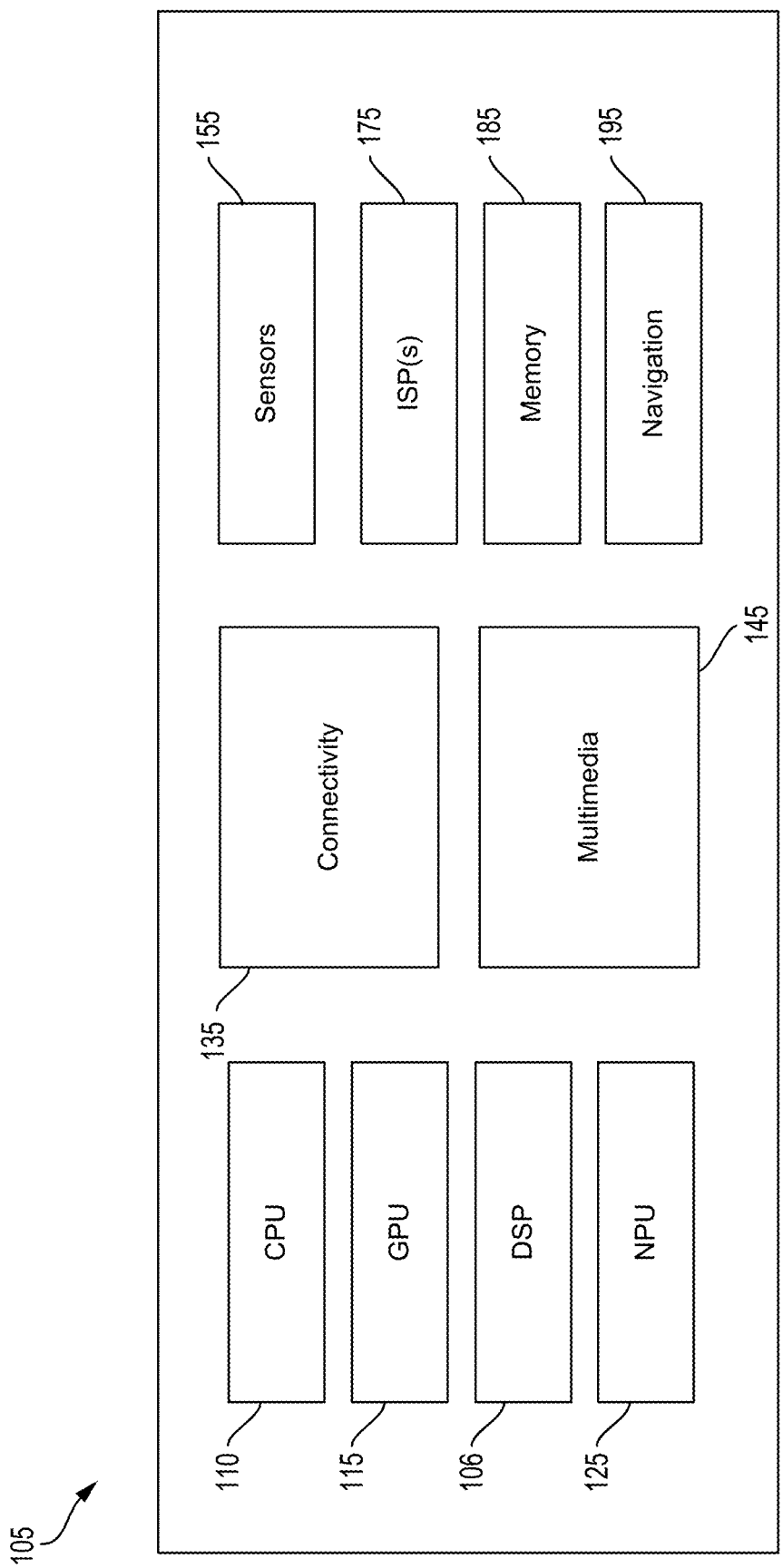
FIG. 1D illustrates an example implementation of a system-on-a-chip (SOC), in accordance with some examples.

FIG. 1D illustrates an example implementation of a system-on-a-chip (SOC) 105, which may include a central processing unit (CPU) 110 or a multi-core CPU, configured to perform one or more of the functions described herein. In some cases, the SOC 105 may be based on an ARM instruction set. In some cases, CPU 110 may be similar to processor 164. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with a CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from a memory block 185.

The SOC 105 may also include additional processing blocks tailored to specific functions, such as a GPU 115, a DSP 106, a connectivity block 135, which may include fifth generation (5G) connectivity, fourth generation long term evolution (4G LTE) connectivity, Wi-Fi connectivity, USB connectivity, Bluetooth connectivity, and the like, and a multimedia processor 145 that may, for example, detect and recognize gestures. In one implementation, the NPU is implemented in the CPU 110, DSP 106, and/or GPU 115. The SOC 105 may also include a sensor processor 155, image signal processors (ISPs) 175, and/or navigation module 195, which may include a global positioning system. In some cases, the navigation module 195 may be similar to navigation components 156 and sensor processor 155 may accept input from, for example, one or more sensors 158. In some cases, the connectivity block 135 may be similar to the radio module 172.

Figure 2A:
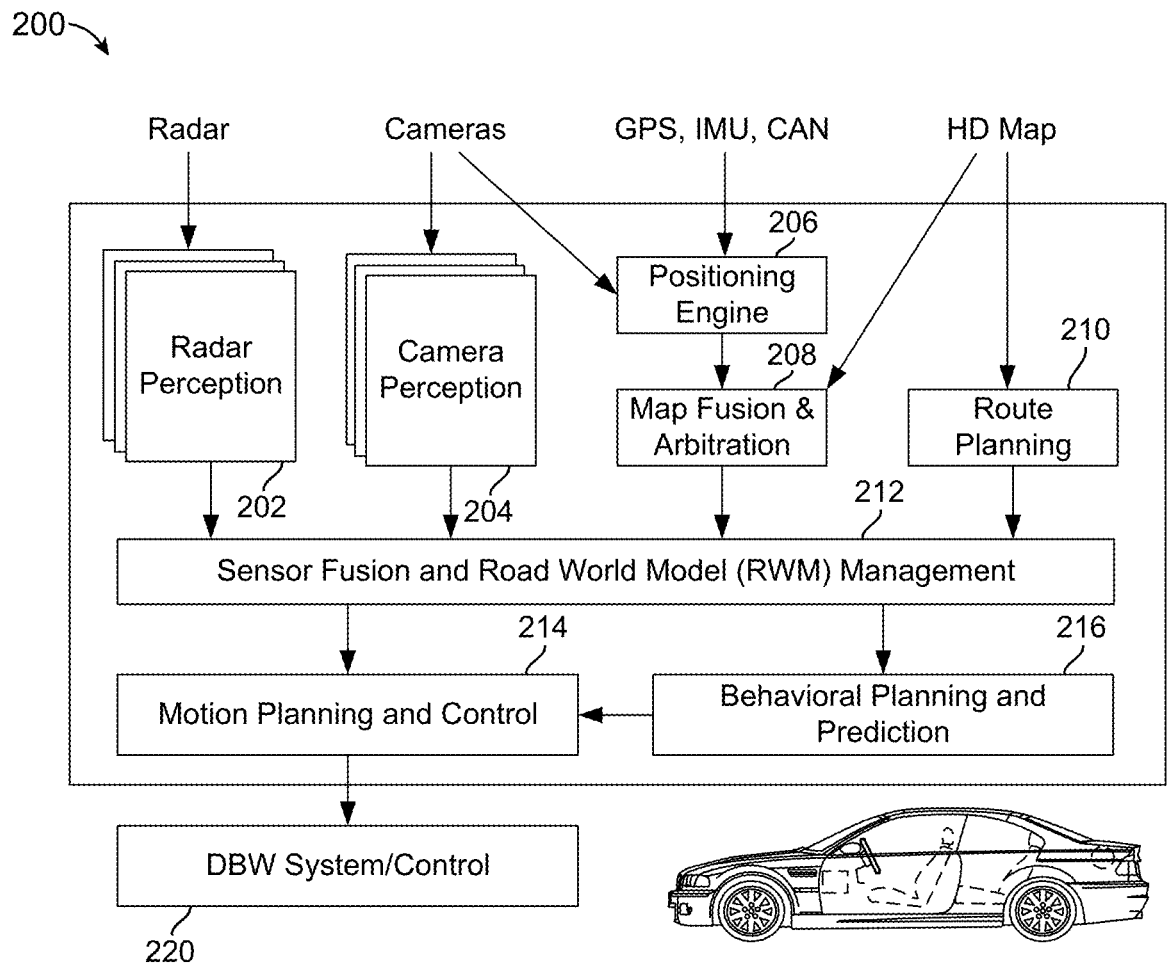
FIG. 2A is a component block diagram illustrating components of an example vehicle management system, in accordance with aspects of the present disclosure.

FIG. 2A illustrates an example of vehicle applications, subsystems, computational elements, or units within a vehicle management system 200, which may be utilized within a vehicle, such as vehicle 100 of FIG. 1A. With reference to FIGS. 1A-2A, in some aspects, the various vehicle applications, computational elements, or units within vehicle management system 200 may be implemented within a system of interconnected computing devices (i.e., subsystems), that communicate data and commands to each other. In other aspects, the vehicle management system 200 may be implemented as a plurality of vehicle applications executing within a single computing device, such as separate threads, processes, algorithms, or computational elements. However, the use of the term vehicle applications in describing various aspects are not intended to imply or require that the corresponding functionality is implemented within a single autonomous (or semi-autonomous) vehicle management system computing device, although that is a potential implementation aspect. Rather the use of the term vehicle applications is intended to encompass subsystems with independent processors, computational elements (e.g., threads, algorithms, subroutines, etc.) running in one or more computing devices, and combinations of subsystems and computational elements.

In various aspects, the vehicle applications executing in a vehicle management system 200 may include (but is not limited to) a radar perception vehicle application 202, a camera perception vehicle application 204, a positioning engine vehicle application 206, a map fusion and arbitration vehicle application 208, a route vehicle planning application 210, sensor fusion and road world model (RWM) management vehicle application 212, motion planning and control vehicle application 214, and behavioral planning and prediction vehicle application 216. The vehicle applications 202-216 are merely examples of some vehicle applications in one example configuration of the vehicle management system 200. In other configurations consistent with various aspects, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system 200. Each of the vehicle applications 202-216 may exchange data, computational results and commands.

The vehicle management system 200 may receive and process data from sensors (e.g., radar, LIDAR, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle steering, throttle and brake controls. The configuration of the vehicle management system 200 and DBW system/control unit 220 illustrated in FIG. 2A is merely an example configuration and other configurations of a vehicle management system and other vehicle components may be used in the various aspects. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., 132) and/or LIDAR (e.g., 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., 122, 136), and process the data to recognize and determine locations of other vehicles and objects within a vicinity of the vehicle 100. The camera perception vehicle application 204 may include use of neural network processing and artificial intelligence methods to recognize objects and vehicles and pass such information on to the sensor fusion and RWM management vehicle application 212.

The positioning engine vehicle application 206 may receive data from various sensors and process the data to determine a position of the vehicle 100. The various sensors may include, but is not limited to, GPS sensor, an IMU, and/or other sensors connected via a CAN bus. The positioning engine vehicle application 206 may also utilize inputs from one or more cameras, such as cameras (e.g., 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc., using localization. The HD map database may be stored in a memory (e.g., memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, camera perception vehicle application 204, map fusion and arbitration vehicle application 208, and route planning vehicle application 210, and use some or all of such inputs to estimate or refine the location and state of the vehicle 100 in relation to the road, other vehicles on the road, and other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element(s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through C-V2X connections, other wireless connections, etc.

As a still further example, the sensor fusion and RWM management vehicle application 212 may monitor perception data from various sensors, such as perception data from a radar perception vehicle application 202, camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control unit 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control unit 220.

The DBW system/control unit 220 may receive the commands or instructions from the motion planning and control vehicle application 214 and translate such information into mechanical control signals for controlling wheel angle, brake, and throttle of the vehicle 100. For example, DBW system/control unit 220 may respond to the computed steering wheel command angle by sending corresponding control signals to the steering wheel controller.

In various aspects, the vehicle management system 200 may include functionality that performs safety checks or oversight of various commands, planning or other decisions of various vehicle applications that could impact vehicle and occupant safety. Such safety checks or oversight functionality may be implemented within a dedicated vehicle application or distributed among various vehicle applications and included as part of the functionality. In some aspects, a variety of safety parameters may be stored in memory, and the safety checks or oversight functionality may compare a determined value (e.g., relative spacing to a nearby vehicle, distance from the roadway centerline, etc.) to corresponding safety parameter(s) and may issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter and may issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
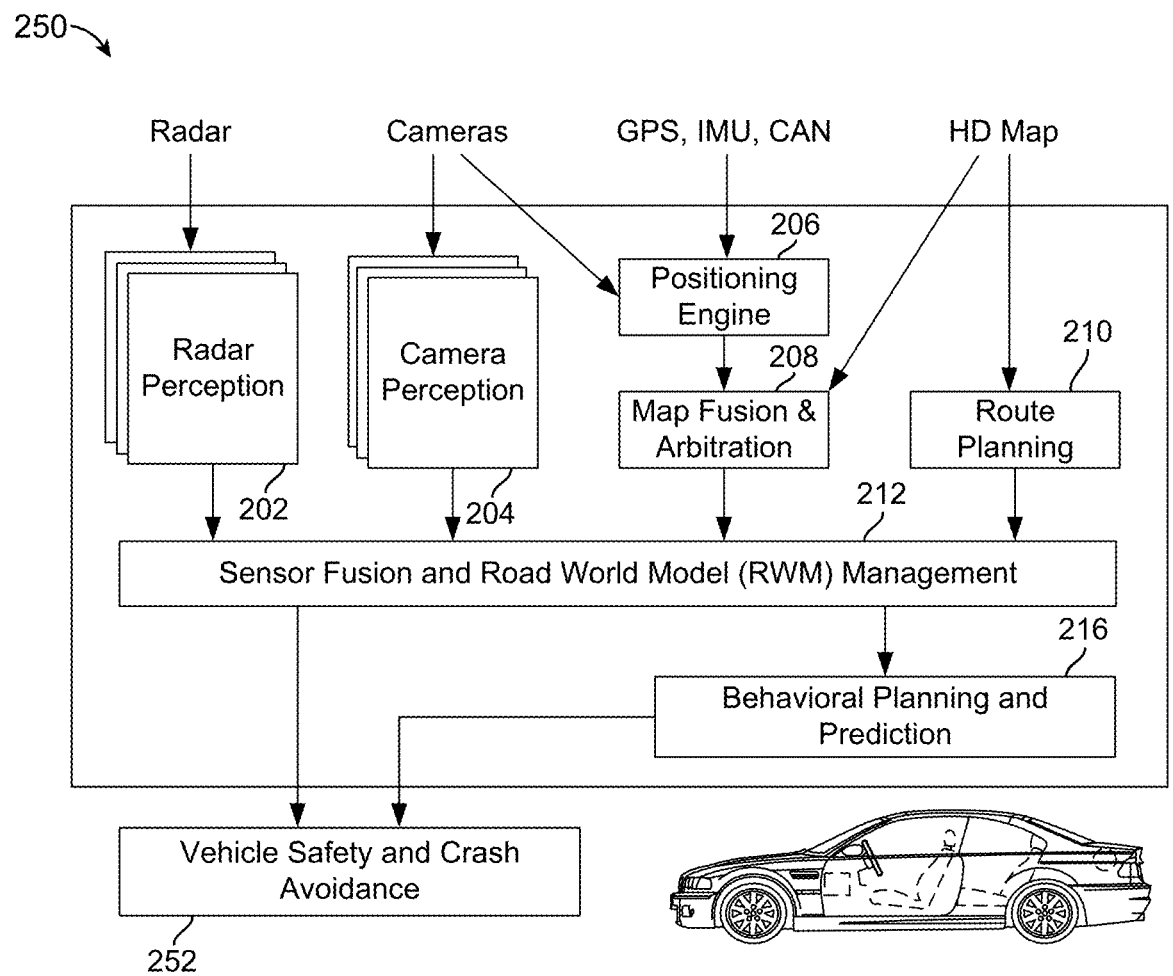
FIG. 2B is a component block diagram illustrating components of another example vehicle management system, in accordance with aspects of the present disclosure.

FIG. 2B illustrates an example of vehicle applications, subsystems, computational elements, or units within a vehicle management system 250, which may be utilized within a vehicle 100. With reference to FIGS. 1A-2B, in some aspects, the vehicle applications 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various aspects, the behavioral planning and prediction vehicle application 216 and/or sensor fusion and RWM management vehicle application 212 may output data to the vehicle safety and crash avoidance system 252. For example, the sensor fusion and RWM management vehicle application 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various aspects, the vehicle safety and crash avoidance system 252 may include functionality that performs safety checks or oversight of various commands, planning, or other decisions of various vehicle applications, as well as human driver actions, that could impact vehicle and occupant safety. In some aspects, a variety of safety parameters may be stored in memory and the vehicle safety and crash avoidance system 252 may compare a determined value (e.g., relative spacing to a nearby vehicle, distance from the roadway centerline, etc.) to corresponding safety parameter (s), and issue a warning or command if the safety parameter is or will be violated. For example, a vehicle safety and crash avoidance system 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter and may issue an override command and/or alarm in response to the steering wheel angle exceeding the safe wheel angle limit.

Systems that usefully (and in some cases autonomously or semi-autonomously) move through the environment, such as autonomous vehicles or semi-autonomous vehicles, need to be able to localize themselves in the environment. For instance, a vehicle may need to be aware of driving surfaces, routes, intersections, exits, places (e.g., gas stations, stores, etc.), etc. based on information to which the vehicle has access (e.g., map information stored locally by the vehicle or accessed from a remote source, such as via a wireless communication with one or more servers).

In some cases, one or more machine learning techniques may be used to detect objects in an environment around a vehicle. A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 3A—FIG. 4.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
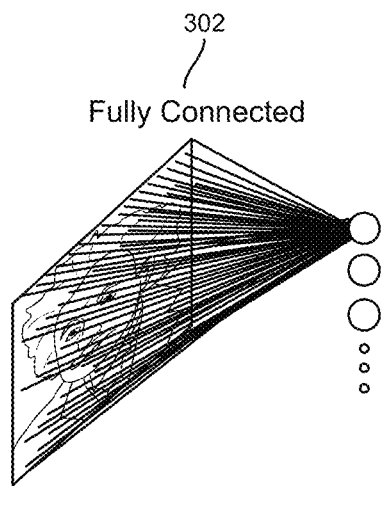
FIG. 3A—FIG. 4 are diagrams illustrating examples of neural networks, in accordance with aspects of the present disclosure.
Figure 3B:
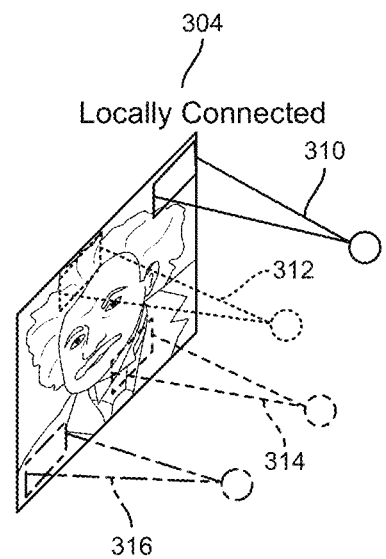

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer because the higher layer neurons in a given region may receive inputs that are tuned through training to the properties of a restricted portion of the total input to the network.

Figure 3C:
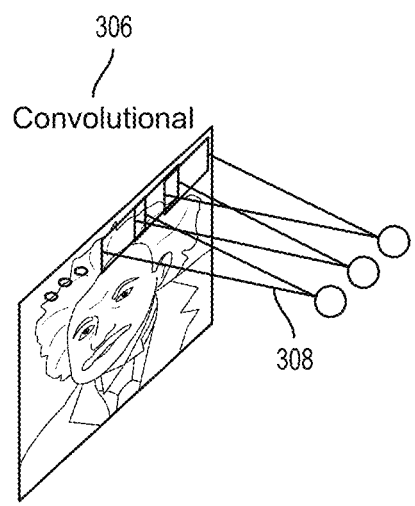

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of video compression and/or decompression, according to aspects of the present disclosure.

Figure 3D:
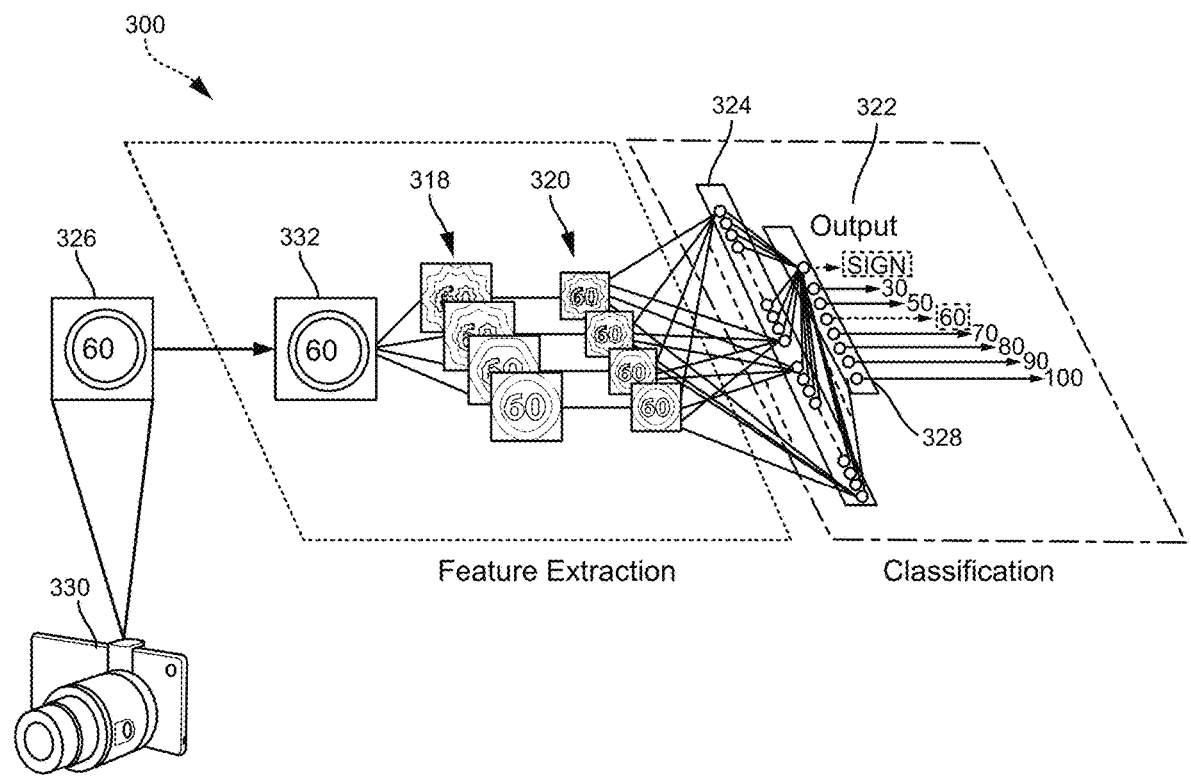

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 4:
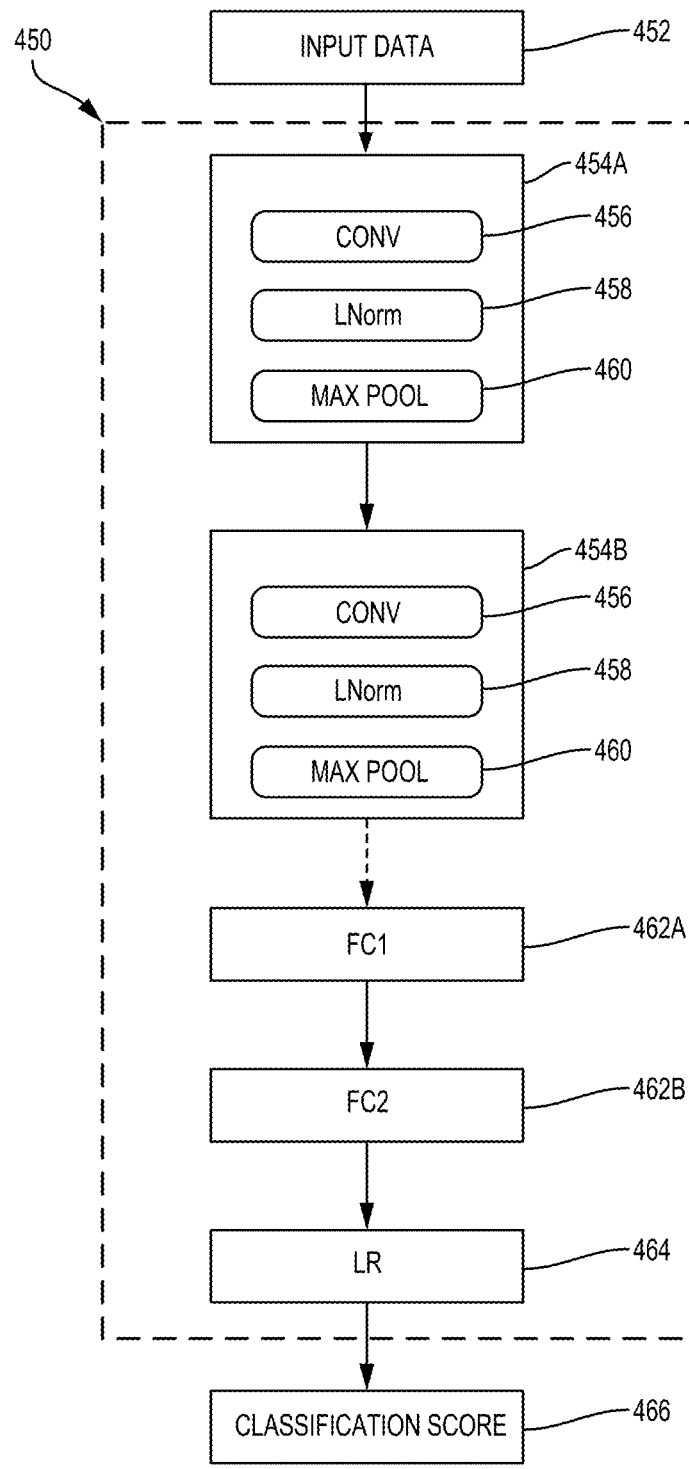

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data 452 to generate a feature map. Although only two convolution blocks 454A, 454B are shown, the present disclosure is not so limiting, and instead, any number of convolution blocks (e.g., convolution blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 110 or GPU 115 of an SOC 105 to achieve high performance and low power consumption. In alternative aspects, the parallel filter banks may be loaded on the DSP 106 or an ISP 175 of an SOC 105. In addition, the deep convolutional network 450 may access other processing blocks that may be present on the SOC 105, such as sensor processor 155 and navigation module 195, dedicated, respectively, to sensors and navigation.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

Figure 5:
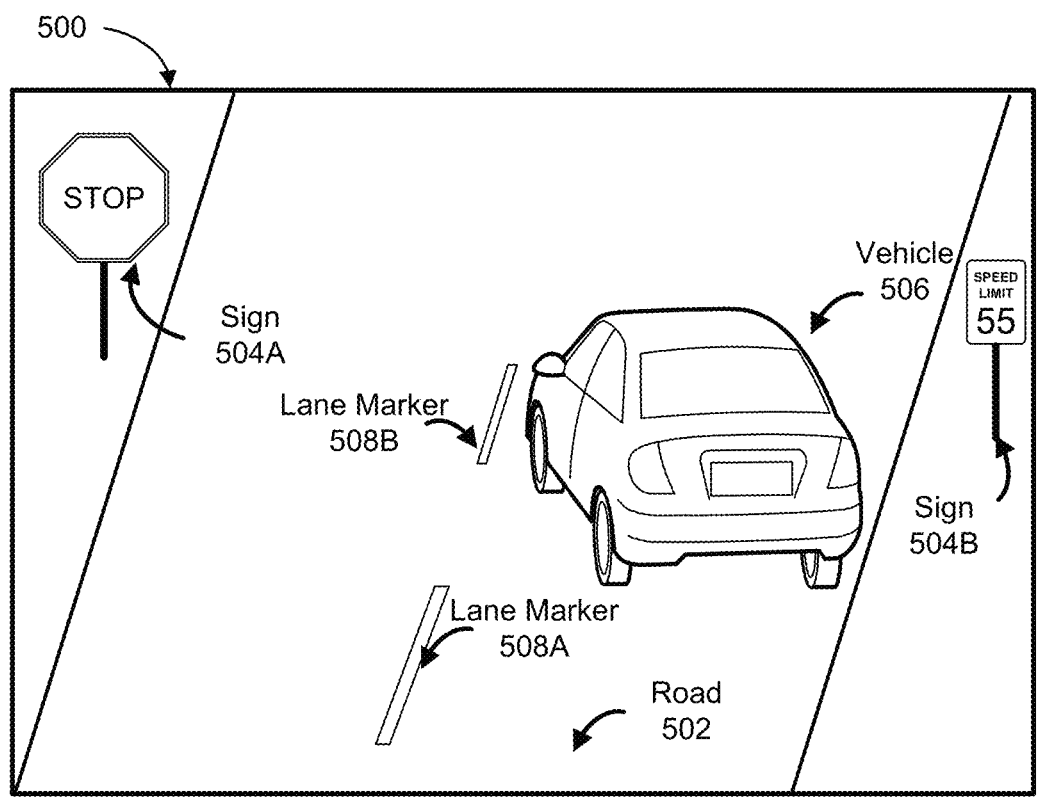
FIG. 5 illustrates an example of localization, in accordance with aspects of the present disclosure.

FIG. 5 illustrates an example of localization, in accordance with aspects of the present disclosure. Localization may be performed by, for example, the map fusion and arbitration vehicle application 208 of FIGS. 2A-2B. In FIG. 5, a vehicle 506 may use localization to accurately place itself in a certain lane on road 502. For example, the vehicle may, based on location information provided by a GNSS receiver system, access an HD map stored locally or from a remote source. In some cases, the HD map may be extremely large and the vehicle 506 may access a portion 500 of the HD map which corresponds to the location of the vehicle 506. The HD map may include information about objects around the vehicle 506, such as for lane markers 508A-508B (collectively, lane markers 508), the road 502, as well as signs 504A-504B (collectively, signs 504) or other objects near the road. In some cases, based on the lane markers 508 visible to sensors of the vehicle 506 and information about the lane markers 508 in the HD map, the vehicle 506 may be able to accurately localize in which lane the vehicle is. However, the lane markers 508 along do not provide much information on how far down the road 502 the vehicle 506 is (e.g., lane marker 508A looks pretty much like lane marker 508B). Instead, the vehicle 506 may use locations of stationary objects, such as sign 504A and 504B, in the HD maps to determine how far along the road 502 the vehicle 506 is (e.g., between lane marker 508A and 508B).

In some cases, the HD map may only have partial information about some objects. For example, the HD map may only include partial information about an object such as a traffic sign, where the partial information may be a center point of the traffic sign and the orientation of the traffic sign (e.g., which way the sign is facing) may not be provided. Additionally, the information in the HD map may be inaccurate, for example, as signs may wobble due to winds, may be unexpectedly relocated due to an accident, may be tilted due to heavy rains, etc. It may be difficult to align sensor data as captured by the vehicle to this partial or inaccurate information. For example, image data as captured by a camera sensor of a vehicle may be able to detect edges of a sign, but it may be difficult to determine where a centroid of the sign is as it is unlikely that there is any visual indication of the centroid. The centroid may be a center point of a face of the sign. This difficulty may be compounded if the sign is not directly facing the ego vehicle but is instead offset. If a width and length of the sign is available in the HD map, the centroid of the sign may be calculated based on the known dimensions and the edge information. However, absent this information, such as when the HD map just includes a centroid for the location of the object, it can be difficult to match the centroid from the HD maps to the edges detected by the sensors.

Figure 6:
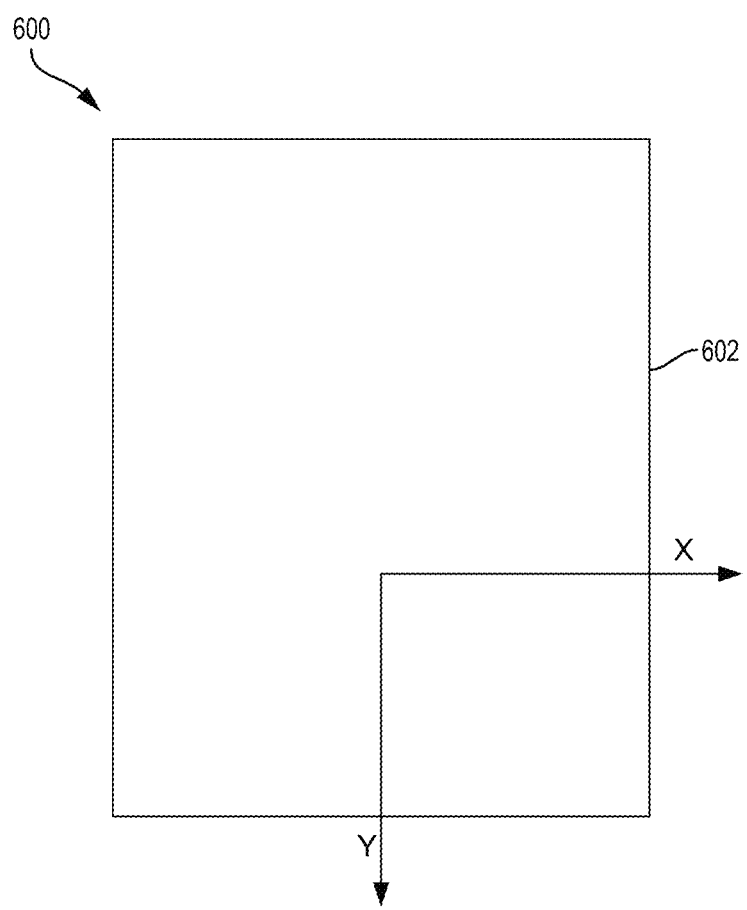
FIG. 6 is a diagram illustrating an example HD map notation for a sign, in accordance with aspects of the present disclosure.

Initially, to help perform object aided localization when complete object information is not available, it may be useful to have a consistent notation for an object, such as traffic sign. FIG. 6 is a diagram 600 illustrating an example HD map notation for a sign 602, in accordance with aspects of the present disclosure. Of note, while this notation is discussed in context of a rectangular sign, this notation can be extended to signs of any shape. The sign 602 can be associated with a coordinate frame f wherein an X-Y axis of the frame f defines the plane (e.g., face) of the sign 602. An origin (e.g., 0,0) of the X-Y axis may be defined as the centroid of the sign plane (e.g., face). In this example, the notation $t_{ab}$ may be used to denote a translation from a frame to b frame in a frame coordinates and $R_{ab}$ to denote rotation from a frame to b frame. In this example, c may be used to denote a camera frame (with the X axis pointing to the right, the Y axis downwards to the bottom, and the Z axis indicating a depth of a camera feature). An East-North-Up (ENU) frame may be denoted by n. In some cases, the four corners of the sign 602 may be represented by $t_{f_{ij}}$ for i, j going from 0 to 1 (e.g., translation from coordinate frame where the origin is the centroid to a coordinate frame that goes from 0 to 1 from the top left corner). Therefore, a top left is (0,0), top right is (0,1), bottom left is (1,0), and bottom right is (1,1). In some cases, the translation representation $t_{f_{ij}}$ may be expanded to account for objects with additional corners.

In some cases, the sensors of the vehicle may detect corners of the sign 602. In this example, the sensors may detect four corners of sign 602 in sensor data, for example using edge detection, semantic segmentation, corner detection, feature detector, or any other recognition technique applicable to the sensors in use. For example, a neural network or deep convolution network (DCN) may be used to recognize visual features, such as corners of a sign, from an image input from an image capturing device, such as a car-mounted camera. In some cases, the corner detection may be performed on a distortion corrected image where distortion correction has been applied to produce an undistorted image.

Based on a corner detected image of the sign 602, a measurement model may be defined. The measurement model may be used to update a Kalman filter. In some cases, the measurement model connects the measurements from the image to the representation of the sign 602 in the HD map. In some cases, a measurement model may be defined as $y_{ij}=\tau_{cf_{ij}}+n_{ij}$, where $y_{ij}$ represents two-dimensional corner measurements (e.g., row, column measurements for where in the image the sign 602 appears) on an undistorted image plane from the camera, Tofu represents a two-dimensional point with respect to a camera center indicating a projection of each traffic sign corner point in 3D on undistorted image, and $n_{ij}$ may be additive white Gaussian noise. In some cases, $\tau_{cf_{ij}}$ may be based on camera properties and defined such that:

$$\tau_{cf_{ij}} = \left( \frac{ft_{cf_{ij}}[0]}{t_{cf_{ij}}[2]} + p_x, \frac{ft_{cf_{ij}}[1]}{t_{cf_{ij}}[2]} + p_y \right), \quad \text{Equation 1}$$

where f is the focal length of the camera, c is the camera frame, and $(p_x, p_y)$ is the principal point of the camera. In Equation 1, $ft_{cf_{ij}}[0]$, and $ft_{cf_{ij}}[1]$ may represent a displacement between corners of the 2D image captured by the camera and the 3D corners of the sign 602 in the HD map and dividing by $t_{cf_{ij}}[2]$ may perform a depth normalization. Equation 1 may be rewritten as $$\tau_{cf_{ij}} = \left( \frac{(Kt_{cf_{ij}})[0]}{(Kt_{cf_{ij}})[2]}, \frac{(Kt_{cf_{ij}})[1]}{(Kt_{cf_{ij}})[2]} \right),$$

where K is intrinsic matrix of camera given by $$\begin{bmatrix} f & 0 & p_x \\ 0 & f & p_y \\ 0 & 0 & 1 \end{bmatrix}.$$

In cases where the HD map provides depth information, but does not include a height/width information for sign 602 (e.g., where the HD map includes a point, such as a centroid or other point indicating the object without additional height/width information about the sign 602), not all the information for $t_{cf_{ij}}$ may be available. Instead, a new measurement model may be used. Where the HD map includes a centroid point (or other point on the plane of the sign 602), then the HD map includes $t_{cf}$, but not $t_{f_{ij}}$, which defines the sign polygon dimensions, and are unavailable in the map. Additionally, where a single point for the object is available in the HD map, a rotation of the object, $R_{cf}$ is unknown. In some cases, updating a previously measured vehicle location based on determined distances may be performed using a Bayesian filter like an extended Kalman filter (EKF). In such cases, a noisy version of $\tau_{cf_{ij}}$ is measured (i.e. $y_{ij}$) and these may be combined together as a function of $t_{cf}$ without any $t_{f_{ij}}$ or $R_{cf}$ dependency. Thus, a new measurement model may be defined as:

$$y = g(y_{00}, y_{01}, y_{11}, y_{10}) = q(t_{cf}) + n, \quad \text{Equation 2}$$

where the combination of $y_{ij}$ results in a noisy version of some function of $t_{cf}$ (along with other constants like K) but not a function of $t_{f_{ij}}$ or $R_{cf}$. In equation 2, $y_{00}, y_{01}, y_{11}, y_{10}$ may be measurements of corners of sign 602 made from the camera frame. As an example for Equation 2, g(•) may be:

$$g(y_{00}, y_{01}, y_{11}, y_{10}) = \frac{\sum_{ij} y_{ij}}{4} \approx q(t_{cf}) = \tau_{cf},$$

where $$\tau_{cf} = \left( \frac{(Kt_{cf})[0]}{(Kt_{cf})[2]}, \frac{(Kt_{cf})[1]}{(Kt_{cf})[2]} \right).$$

-continued

Note that $$y_{ij} = \tau_{cf_{ij}}[0:1] + n_{ij}$$

and thus:

$$\sum_{ij} y_{ij} = \sum_{ij} \tau_{cf_{ij}}[0:1] + \sum_{ij} n_{ij},$$

which implies:

$$\sum_{ij} y_{ij} = \sum_{ij} \left( \frac{ft_{cf_{ij}}[0]}{t_{cf_{ij}}[2]} + p_x, \frac{ft_{cf_{ij}}[1]}{t_{cf_{ij}}[2]} + p_y \right) + n.$$

For a mean of $t_{ff_{ij}}$ over all i, j is zero and thus, a mean of $t_{cf_{ij}}$ over all i, j is same as $t_{cf}$ where $t_{cf_{ij}}=t_{cf}+R_{cf}t_{ff_{ij}}$. If we approximate depth $t_{cf_{ij}}[2] \approx t_{cf}[2]$, then $\frac{1}{4}\Sigma_{ij}y_{ij} \approx \tau_{cf}$. Thus, $g(\cdot)$ may be more accurately approximated by $\tau_{cf}$ as the depth increases. In some cases, signs which are further away than a threshold allow the approximation $t_{cf_{ij}}[2] \approx t_{cf}[2]$ to be reasonable. In some cases, this threshold may be approximately 30 meters. Of note, as the depth $t_{cf_{ij}}[2]$ is in the numerator, in cases where the depth of the corners of the sign varies substantially, this approximation may not hold. In such cases, signs where the depth of the corners vary substantially may be dropped, or only considered when a distance to the sign is relatively large (e.g., above the threshold).

Applying Equation 2 to an EKF update may be defined as $y=\tau_{cf}+n$ where n is additive white Gaussian noise. In some cases, y may act as a kind of an average of the corners measurements of the projection of sign 602 on the camera frame. The left-hand side may be the output of the $g(\cdot)$ function and on the right-hand side, the $\tau_{cf}$ may be obtained using the camera pose and map centroid point information and then back-projecting on the camera plane. The $\tau_{cf}$ may define the camera map point features (e.g., projection of centroid of the sign) in the camera frame. So based on the camera pose, the corner information from the camera is used to estimate a center point for the object, such as sign 602 and compared to the map centroid point information. Thus:

$$\tau_{cf} = \left( \frac{ft_{cf}[0]}{t_{cf}[2]} + p_x, \frac{ft_{cf}[1]}{t_{cf}[2]} + p_y \right),$$

where:

$$t_{cf} = t_{cn} + R_{cn}t_{nf} = R_{nc}^{-1}(t_{nf} - t_{nc}).$$

Here, $t_{nf}$ are map point features in an east north up (ENU) frame n and $t_{nc}=t_{nr}+R_{nr}t_{rc}$ and $R_{nc}=R_{nr}R_{rc}$ where the ego pose in ENU frame is given by are translation vector $t_{nr}$ and rotation matrix $R_{nr}$. Additionally, $t_{cn}$ and $R_{cn}$ may be provided by the previous EKF state.

In some cases, a map sign may be associated with a corresponding y measurement to perform an EKF update. This association may be performed in a number of ways. For example, a first way may be to perform the association on the image plane. In some cases, the association on the image plane may be performed with $y=\tau_{cf}[0:1]+n$, where a nearest neighbor association is preferred. However, there is no notion of depth of objects on the image plane. Also, without visible corners of signs, it can be difficult to distinguish two signs with varying depths, but which have centroid projections that are relatively close to each other. These scenarios can degrade localization based on nearest neighbor associations. To account for such scenarios, additional checks on top of nearest neighbor association may be made. For example, a check may be added so that if a nearest neighbor distance from a centroid measurement (e.g., the HD map object centroid or other point on the plane) to the projection of traffic sign map centroid is d, then a second nearest distance should be at least K×d, for some K>1. As another example, a check may be added so that if a nearest neighbor distance from a centroid measurement to the projection of traffic sign map centroid is d, then $d \leq d_{max}$, for some maximum allowable nearest neighbor distance.

As another example, another way that the map sign may be associated with a corresponding y measurement may be to perform the association using 3D coordinates (e.g., depth information). In some cases, performing the association using 3D coordinates may involve a corresponding depth measurement. For example, an estimate for the depth of the object may be made using a simultaneous localization and mapping (SLAM) without using the HD map with partial object information. In some cases, SLAM refers to a class of techniques where a map of an environment (e.g., a map of an environment being modeled, for example, by a vehicle) is created while simultaneously tracking the pose of a camera (e.g., of the vehicle) relative to that map. To perform the association using 3D coordinates, a depth estimation for camera perception (e.g., from camera sensors on the vehicle) may be performed by tracking the corner points over multiple frames using EKF or similar filtering approach and comparing these tracked corner points to object points, such as centroids, in the HD map. In such cases, the depth may be used to back project the camera perception corner points in 3D world coordinates and the nearest neighbor association is done in 3D. This can make the overall localization algorithm complex since it involves first a SLAM or other depth estimation component (to estimate a traffic sign map using camera measurements) and then performing localization against the HD map using the estimated 3D map of traffic sign for performing association. In some cases, if the object fails either association check, the object may be dropped for use in localization.

After associating the map sign with a corresponding y measurement, a measurement Jacobian may be used to update the EKF that tracks the ego pose of the vehicle in an ENU frame using following state variables—$t_{nr}$, $\phi$, $\theta$, $\psi$ where $\phi$, $\theta$, $\psi$ are the roll, pitch and yaw corresponding to $R_{nr}$. In some cases, these variables may be written as:

$$A = -KR_{cn}$$

and $$Kt_{cf} = A(t_{nr} + R_{nr}t_{rc} - t_{nf}) = b.$$

Thus, $\tau_{cf}[0]=b[0]/b[2]$ and similarly $\tau_{cf}[1]=b[1]/b[2]$. In some cases, the Jacobian matrix is 2×6 and a first 2×3 submatrix may be as follows:

$$\frac{\partial \tau_{cf}[0]}{\partial t_{nr}[0]} = \frac{\partial \tau_{cf}[0]}{\partial b[0]} \frac{\partial b[0]}{\partial t_{nr}[0]} + \frac{\partial \tau_{cf}[0]}{\partial b[2]} \frac{\partial b[2]}{\partial t_{nr}[0]} = \frac{A[0,0]}{b[2]} - \frac{b[0]A[2,0]}{b[2]^2}$$

$$\frac{\partial \tau_{cf}[1]}{\partial t_{nr}[0]} = \frac{\partial \tau_{cf}[1]}{\partial b[1]} \frac{\partial b[1]}{\partial t_{nr}[0]} + \frac{\partial \tau_{cf}[1]}{\partial b[2]} \frac{\partial b[2]}{\partial t_{nr}[0]} = \frac{A[1,0]}{b[2]} - \frac{b[1]A[2,0]}{b[2]^2}$$

$$\frac{\partial \tau_{cf}[0]}{\partial t_{nr}[1]} = \frac{\partial \tau_{cf}[0]}{\partial b[0]} \frac{\partial b[0]}{\partial t_{nr}[1]} + \frac{\partial \tau_{cf}[0]}{\partial b[2]} \frac{\partial b[2]}{\partial t_{nr}[0]} = \frac{A[0,1]}{b[2]} - \frac{b[0]A[2,1]}{b[2]^2}$$

-continued $$\frac{\partial \tau_{cf}[1]}{\partial t_{nr}[1]} = \frac{\partial \tau_{cf}[1]}{\partial b[1]} \frac{\partial b[1]}{\partial t_{nr}[1]} + \frac{\partial \tau_{cf}[1]}{\partial b[2]} \frac{\partial b[2]}{\partial t_{nr}[1]} = \frac{A[1,1]}{b[2]} - \frac{b[1]A[2,1]}{b[2]^2}$$

$$\frac{\partial \tau_{cf}[1]}{\partial t_{nr}[2]} = \frac{\partial \tau_{cf}[0]}{\partial b[1]} \frac{\partial b[1]}{\partial t_{nr}[2]} + \frac{\partial \tau_{cf}[0]}{\partial b[2]} \frac{\partial b[2]}{\partial t_{nr}[2]} = \frac{A[0,2]}{b[2]} - \frac{b[0]A[2,2]}{b[2]^2}$$

$$\frac{\partial \tau_{cf}[1]}{\partial t_{nr}[2]} = \frac{\partial \tau_{cf}[1]}{\partial b[1]} \frac{\partial b[1]}{\partial t_{nr}[2]} + \frac{\partial \tau_{cf}[1]}{\partial b[2]} \frac{\partial b[2]}{\partial t_{nr}[2]} = \frac{A[1,2]}{b[2]} - \frac{b[1]A[2,2]}{b[2]^2}$$

For the next 2×3 submatrix, a notation that may be used is $R_{rn} = R_\phi R_\theta R_\psi$ where $R_{\phi\phi}$, $R_\theta$, $R_\psi$ are rotation matrices corresponding to Euler angles $\phi$, $\theta$, $\psi$ (e.g., roll, pitch, and yaw angles). Therefore, the submatrix may be:

$$\frac{\partial \tau_{cf}[0]}{\partial \phi} = \frac{\partial \tau_{cf}[0]}{\partial b[0]} \frac{\partial b[0]}{\partial \phi} + \frac{\partial \tau_{cf}[0]}{\partial b[2]} \frac{\partial b[2]}{\partial \phi} = \frac{1}{b[2]} \frac{\partial b[0]}{\partial \phi} - \frac{b[0]}{b[2]^2} \frac{\partial b[2]}{\partial \phi}.$$

where:

$$b = A(t_{nr} + R_{nr}t_{rc} - t_{nf}) =$$

$$-KR_{cr}R_{rn}(t_{nr} + R_{nr}t_{rc} - t_{nf}) = -KR_{cr}R_{rn}(t_{nr} - t_{nf}) + KR_{cr}t_{rc}$$

$$b = A(t_{nr} + R_{nr}t_{rc} - t_{nf}) =$$

$$-KR_{cr}R_{rn}(t_{nr} + R_{nr}t_{rc} - t_{nf}) = -KR_{cr}R_{rn}(t_{nr} - t_{nf}) + KR_{cr}t_{rc}$$

$$b = A(t_{nr} + R_{nr}t_{rc} - t_{nf}) =$$

$$-KR_{cr}R_{rn}(t_{nr} + R_{nr}t_{rc} - t_{nf}) = -KR_{cr}R_{rn}(t_{nr} - t_{nf}) + KR_{cr}t_{rc}$$

In some cases, the last term may be ignored since the last term is independent of $\phi$, $\theta$, $\psi$. Therefore:

$$\frac{\partial \tau_{cf}[0]}{\partial \phi} = \frac{v[0]}{b[2]} - \frac{b[0]v[2]}{b[2]^2},$$

where $$v_\phi = KR_{cr}\dot{R}_\phi R_\theta R_\psi (t_{nf} - t_{nr}).$$

Similarly:

$$\frac{\partial \tau_{cf}[1]}{\partial \phi} = \frac{1}{b[2]} \frac{\partial b[1]}{\partial \phi} - \frac{b[1]}{b[2]^2} \frac{\partial b[2]}{\partial \phi} = \frac{v_\phi[1]}{b[2]} - \frac{b[1]v_\phi[2]}{b[2]^2},$$

and $$\frac{\partial \tau_{cf}[0]}{\partial \theta} \text{ and } \frac{\partial \tau_{cf}[1]}{\partial \theta},$$

as well as:

$$\frac{\partial \tau_{cf}[0]}{\partial \psi} \text{ and } \frac{\partial \tau_{cf}[1]}{\partial \psi},$$

are derived as by replacing $v_\phi$ with $v_\theta$ and $v_\psi$, respectively. Therefore:

$$v_\theta = KR_{cr}R_\phi \dot{R}_\theta R_\psi (t_{nf} - t_{nr})$$

and $$v_\psi = KR_{cr}R_\phi R_\theta \dot{R}_\psi (t_{nf} - t_{nr}).$$

In some cases, sensors of the vehicle may be configured to obtain centroid information in addition to corner information. For example, the vehicle management system 200 of FIG. 2A and/or vehicle management system 250 of FIG. 2B may include neural networks trained to predict a centroid based on corner information. This case may be similar to the case where the vehicle sensors can be used to obtain corner information, except that as the vehicle can detect sign centroids, a g(•) function may not be needed as the g(•) function helps turn the corner measurements into centroid measurements. Additionally, there may be no need to preclude signs <κ depth.

In some cases, sensors of the vehicle may be configured to obtain corner information (e.g., measurements) and the HD map may include centroid information of objects along with a heading direction indicating a direction the object, such as sign 602, is facing. In cases where heading information is available for objects, an EKF update may be determined as discussed above with respect to the case where the vehicle sensors can be used to obtain corner information. The heading information can be used to derive accurate association between the map sign and corresponding y measurement when performing association on the image plane. In some cases, where the heading information is available, $y = \tau_{cf}[0:1] + n$, and a nearest neighbor association may be used. In some cases, one or more association checks may be performed to verify the nearest neighbor association.

As an example of such an association check, a check may be added so that a nearest neighbor distance from a centroid measurement (e.g., the HD map object centroid or other point on the plane) to the projection of traffic sign map centroid is d, then a second nearest distance should be at least K×d, for some K>1. As another example, a check may be added so if a nearest neighbor distance from a centroid measurement to the projection of a sign map centroid is d, then d≤$d_{max}$, for some maximum allowable nearest neighbor distance.

As another example of an association check, a check that $|\theta - \hat{\theta}| < \varepsilon$ to accept an association, or else reject for some $\varepsilon > 0$ may be made. Here $\theta$ is a sign face heading direction (for example pitch, yaw, or roll angle) that is available in the HD map and $\hat{\theta}$ is the sign face heading estimated obtained based on the detected corners of a sign. For example, 3D homogeneous coordinates may be defined corresponding to 2D measurements $y_{ij}$ as $y_{ij}$. In some cases, homogeneous coordinates add, to the 2D measurements, a third dimension with a set or default value, such as 1. Vanishing points may be defined as $$v_x = (y_{00} \times y_{10}) \times (y_{01} \times y_{11}),$$

and $$v_y = (y_{00} \times y_{01}) \times (y_{10} \times y_{11}).$$

In some cases, a rotation matrix $\widetilde{R_{cf}}$ may be:

$$\left( \frac{K^{-1}v_x}{\|K^{-1}v_x\|}, \frac{K^{-1}v_y}{\|K^{-1}v_y\|}, \frac{K^{-1}v_x \times K^{-1}v_y}{\|K^{-1}v_x\| \|K^{-1}v_y\|} \right).$$

Due to noisy measurements, this need not be a true rotation matrix and thus closest rotation matrix to the above with respect to a Frobenius norm can be chosen as:

$$\widehat{R}_{cf} = \frac{UV^T}{\det(UV^T)},$$

where $UDV^T$ is singular value decomposition of:

$$\left( \frac{K^{-1}v_x}{\|K^{-1}v_x\|}, \frac{K^{-1}v_y}{\|K^{-1}v_y\|}, \frac{K^{-1}v_x \times K^{-1}v_y}{\|K^{-1}v_x\|\|K^{-1}v_y\|} \right),$$

and det(•) implies determinant of a matrix (e.g., values for U and V may be obtained based on the decomposition of the above matrix). In some cases, using $\widetilde{R_{cf}}$ roll, pitch and yaw can be determined to use in the additional check, for example, against roll, pitch, any/or yaw angle provided in the HD map.

As indicated above, HD maps may include for objects, such as signs, location information for a centroid of the object. In some cases, the HD map may also include a unique identifier for the object. In some cases, HD maps may be improved to include additional information for objects. For example, in addition to location information for a centroid and a unique identifier for an object, the HD map may include a heading direction for the object. For example, this heading direction may include an indication of roll, pitch, yaw, or any combination thereof. For a sign, this heading direction may be provided for a face of the sign. In some cases, HD maps may include, for an object, a unique identifier, location information for corner points or perimeter points (e.g., for curved surfaces). In some examples, the HD map may also include one or more standard deviations indicating an uncertainty for the corner point. In some cases, the HD map may also include an orientation of objects, for example using Euler/Rodrigues angles, quaternions or a rotation matrix. In some example, the HD map may also include uncertainty information for the orientation of objects. In some cases, the HD map may include an indication of a shape of certain objects, such as signs. For example, the HD map may indicate if the sign is a rectangle, diamond, circle, etc.

Figure 7:
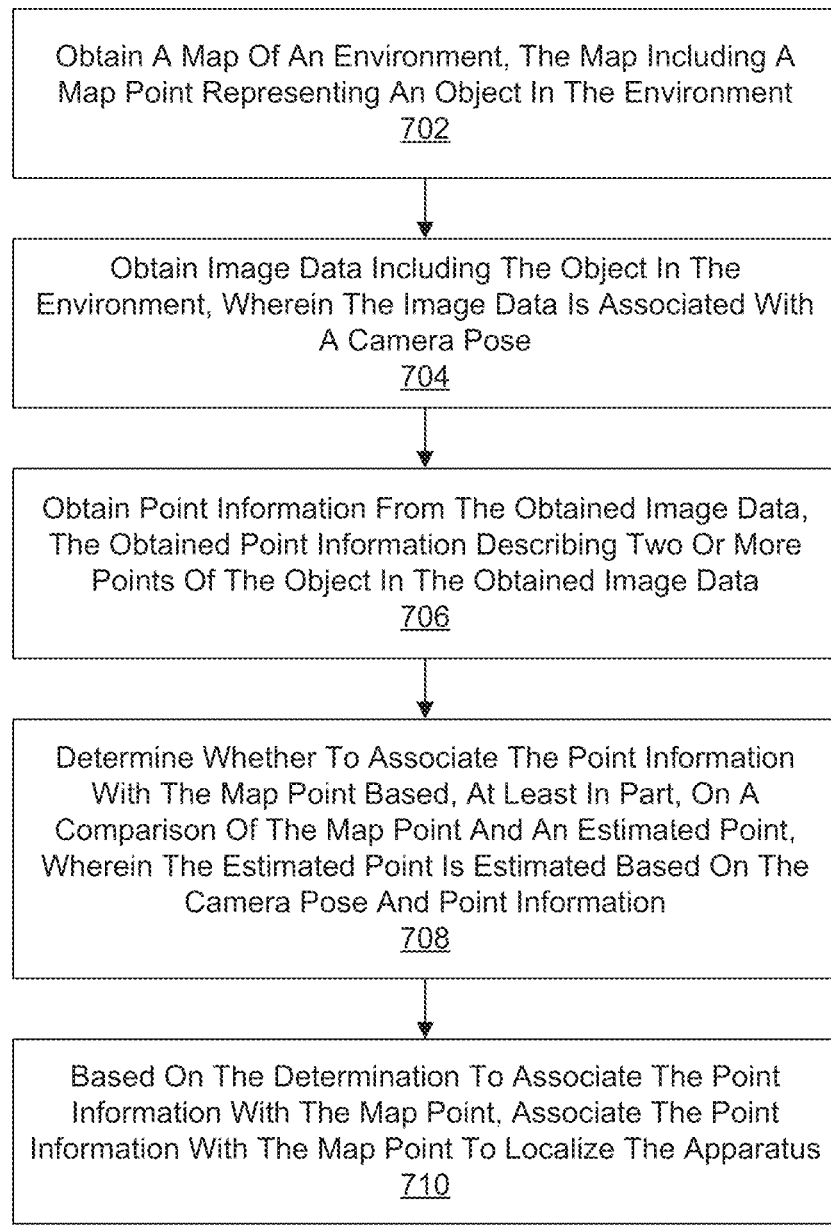
FIG. 7 is a flow diagram illustrating an example of a process for object aided localization without complete object information, in accordance with aspects of the present disclosure.

FIG. 7 is a flow diagram illustrating an example of a process 700 for object aided localization without complete object information, in accordance with aspects of the present disclosure. The process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 700 may be implemented as software components that are executed and run on one or more processors.

At block 702, the computing device (or component thereof) may obtain a map of an environment. In some cases, the map includes a map point representing an object in the environment. In some cases, the map point comprises a centroid of the object in the environment.

At block 704, the computing device (or component thereof) may obtain image data (e.g., one or more images or portions of images) including the object in the environment. In some cases, the image data is associated with one or more camera poses (e.g., an image can be associated with or correspond to a camera pose of a camera used to capture the image).

At block 706, the computing device (or component thereof) may obtain point information from the obtained image data. In some cases, the obtained point information describes two or more points of the object in the obtained image data. The computing device (or component thereof) may determine a distance to the object is greater than a threshold distance; and obtain the point information from the obtained image data based on the distance to the object being greater than the threshold distance. In some cases, the point information includes corner information describing three or more corners of the object in the obtained image data. In some cases, the estimated point includes an estimated center point and estimated direction the object is facing.

At block 708, the computing device (or component thereof) may determine whether to associate the point information with the map point based, at least in part, on a comparison of the map point and an estimated point. In some cases, the estimated point is estimated based on the camera pose and point information. The computing device (or component thereof) may determine whether to associate the point information with the map point by projecting the map point to an image plane for comparison to an estimated point. In some cases, the point information includes corner information describing three or more corners of the object in the obtained image data. In some cases, the estimated point includes an estimated center point that is estimated based on the camera pose, map point, and the corner information.

At block 710, the computing device (or component thereof) may, based on the determination to associate the point information with the map point, associate the point information with the map point to localize the apparatus. The computing device (or component thereof) may associate the point information with the map point on an image plane. The computing device (or component thereof) may associate the point information with the map point based on a distance between the projected map point on the image plane and the estimated point. In some cases, the distance between the projected map point on the image plane and the estimated point is less than a distance to a nearest neighbor object. In some cases, the distance between the projected map point on the image plane and the estimated point is less than a maximum distance. The computing device (or component thereof) may associate the point information with the projected map point based on three dimensional coordinates of the map point.

The computing device (or component thereof) may receive an estimated three-dimensional map of the environment. The computing device (or component thereof) may associate the point information with the map point based on a comparison between the estimated three-dimensional map and the map of an environment.

In some examples, the processes described herein (e.g., process 700 and/or other process described herein) may be performed by a computing device or apparatus. In another example, the process 700 may be performed by the vehicle 100 of FIG. 1A.

Figure 8:
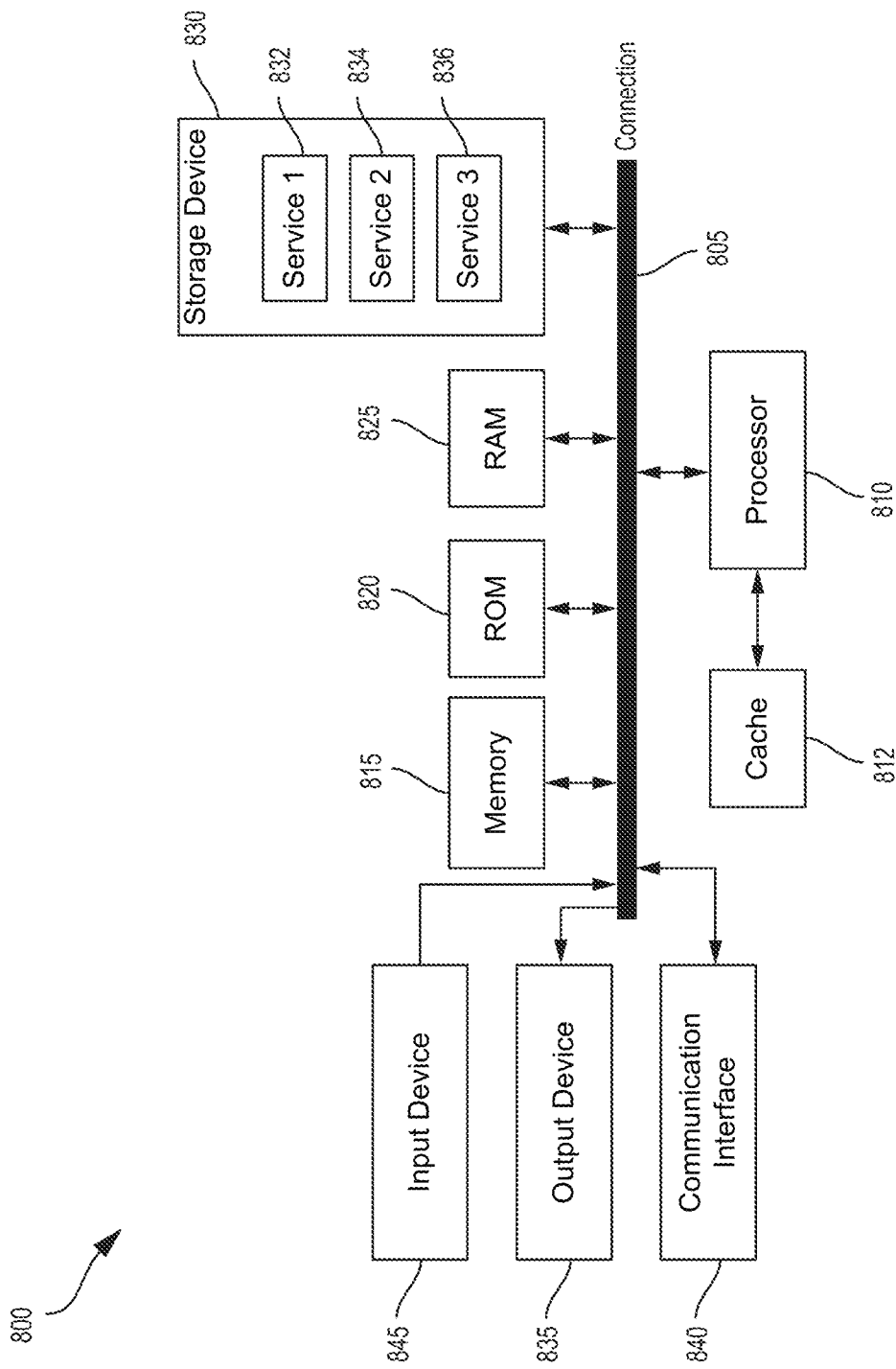
FIG. 8 is a diagram illustrating an example of a system for implementing certain aspects of the present technology.

FIG. 8 is a diagram illustrating an example of a system for implementing certain aspects of the present technology. In particular, FIG. 8 illustrates an example of computing system 800, which may be for example any computing device making up internal computing system, a remote computing system, a camera, or any component thereof in which the components of the system are in communication with each other using connection 805. Connection 805 may be a physical connection using a bus, or a direct connection into processor 810, such as in a chipset architecture. Connection 805 may also be a virtual connection, networked connection, or logical connection.

In some aspects, computing system 800 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 may include a cache 812 of high-speed memory connected directly with, in close proximity to, or integrated as part of processor 810.

Processor 810 may include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms. In some instances, multimodal systems may enable a user to provide multiple types of input/output to communicate with computing system 800.

Computing system 800 may include communications interface 840, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 may include software services, servers, services, etc., that when the code that defines such software is executed by the processor 810, it causes the system to perform a function. In some aspects, a hardware service that performs a particular function may include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for localization, comprising: at least one memory comprising instructions; and at least one processor coupled to the at least one memory and configured to: obtain a map of an environment, the map including a map point representing an object in the environment; obtain image data including the object in the environment, wherein the image data is associated with a camera pose; obtain point information from the obtained image data, the obtained point information describing two or more points of the object in the obtained image data; determine whether to associate the point information with the map point based, at least in part, on a comparison of the map point and an estimated point, wherein the estimated point is estimated based on the camera pose and point information; and based on the determination whether to associate the point information with the map point, associate the point information with the map point to localize the apparatus.

Aspect 2. The apparatus of Aspect 1, wherein, to determine whether to associate the point information with the map point, the at least one processor is further configured to project the map point to an image plane for comparison to an estimated point.

Aspect 3. The apparatus of Aspect 2, wherein the point information includes corner information describing three or more corners of the object in the obtained image data, and wherein the estimated point includes an estimated center point that is estimated based on the camera pose, map point, and the corner information.

Aspect 4. The apparatus of Aspect 3, wherein the map point comprises a centroid of the object in the environment.

Aspect 5. The apparatus of any one of Aspects 2 to 4, wherein the at least one processor is configured to associate the point information with the map point on an image plane.

Aspect 6. The apparatus of Aspect 5, wherein the at least one processor is configured to associate the point information with the map point based on a distance between the projected map point on the image plane and the estimated point.

Aspect 7. The apparatus of Aspect 6, wherein the distance between the projected map point on the image plane and the estimated point is less than a distance to a nearest neighbor object.

Aspect 8. The apparatus of Aspect 6, wherein the distance between the projected map point on the image plane and the estimated point is less than a maximum distance.

Aspect 9. The apparatus of any one of Aspects 5 to 8, wherein the at least one processor is configured to associate the point information with the projected map point based on three dimensional coordinates of the map point.

Aspect 10. The apparatus of any one of Aspects 5 to 9, wherein the at least one processor is further configured to: receive an estimated three-dimensional map of the environment; and associate the point information with the map point based on a comparison between the estimated three-dimensional map and the map of an environment.

Aspect 11. The apparatus of any one of Aspects 1 to 10, wherein the at least one processor is further configured to: determine a distance to the object is greater than a threshold distance; and obtain the point information from the obtained image data based on the distance to the object being greater than the threshold distance.

Aspect 12. The apparatus of any one of Aspects 1 to 11, wherein the point information includes corner information describing three or more corners of the object in the obtained image data, and wherein the estimated point includes an estimated center point and estimated direction the object is facing.

Aspect 13. A method for localization, comprising: obtaining a map of an environment, the map including a map point representing an object in the environment; obtaining image data including the object in the environment, wherein the image data is associated with a camera pose; obtaining point information from the obtained image data, the obtained point information describing two or more points of the object in the obtained image data; determining whether to associate the point information with the map point based, at least in part, on a comparison of the map point and an estimated point, wherein the estimated point is estimated based on the camera pose and point information; and based on the determination whether to associate the point information with the map point, associating the point information with the map point to localize an apparatus.

Aspect 14. The method of Aspect 13, wherein determining whether to associate the point information with the map point comprises projecting the map point to an image plane for comparison to an estimated point.

Aspect 15. The method of Aspect 14, wherein the point information includes corner information describing three or more corners of the object in the obtained image data, and wherein the estimated point includes an estimated center point that is estimated based on the camera pose, map point, and the corner information.

Aspect 16. The method of Aspect 15, wherein the map point comprises a centroid of the object in the environment.

Aspect 17. The method of any one of Aspects 14 to 16, wherein the point information is associated with the map point on an image plane.

Aspect 18. The method of Aspect 17, wherein associating the point information with the map point is based on a distance between the projected map point on the image plane and the estimated point.

Aspect 19. The method of Aspect 18, wherein the distance between the projected map point on the image plane and the estimated point is less than a distance to a nearest neighbor object.

Aspect 20. The method of Aspect 18, wherein the distance between the projected map point on the image plane and the estimated point is less than a maximum distance.

Aspect 21. The method of any one of Aspects 17 to 20, wherein associating the point information with the projected map point is based on three dimensional coordinates of the map point.

Aspect 22. The method of any one of Aspects 17 to 21, further comprising: receiving an estimated three-dimensional map of the environment; and associating the point information with the map point based on a comparison between the estimated three-dimensional map and the map of an environment.

Aspect 23. The method of any one of Aspects 13 to 22, further comprising: determining a distance to the object is greater than a threshold distance; and obtaining the point information from the obtained image data based on the distance to the object being greater than the threshold distance.

Aspect 24. The method of any one of Aspects 13 to 23, wherein the point information includes corner information describing three or more corners of the object in the obtained image data, and wherein the estimated point includes an estimated center point and estimated direction the object is facing.

Aspect 25. A non-transitory computer-readable medium having stored thereon instructions that, when executed by at least one processor, cause the at least one processor to: obtain a map of an environment, the map including a map point representing an object in the environment; obtain image data including the object in the environment, wherein the image data is associated with a camera pose; obtain point information from the obtained image data, the obtained point information describing two or more points of the object in the obtained image data; determine whether to associate the point information with the map point based, at least in part, on a comparison of the map point and an estimated point, wherein the estimated point is estimated based on the camera pose and point information; and based on the determination whether to associate the point information with the map point, associate the point information with the map point to localize an apparatus.

Aspect 26. The non-transitory computer-readable medium of Aspect 25, wherein, to determine whether to associate the point information with the map point, instructions further cause the at least one processor to project the map point to an image plane for comparison to an estimated point.

Aspect 27. The non-transitory computer-readable medium of Aspect 26, wherein the point information includes corner information describing three or more corners of the object in the obtained image data, and wherein the estimated point includes an estimated center point that is estimated based on the camera pose, map point, and the corner information.

Aspect 28. The non-transitory computer-readable medium of Aspect 27, wherein the map point comprises a centroid of the object in the environment.

Aspect 29. The non-transitory computer-readable medium of any one of Aspects 26 to 28, wherein instructions cause the at least one processor to associate the point information with the map point on an image plane.

Aspect 30. The non-transitory computer-readable medium of Aspect 29, wherein the instructions cause the at least one processor to associate the point information with the map point based on a distance between the projected map point on the image plane and the estimated point.

Aspect 31. The non-transitory computer-readable medium of Aspect 30, wherein the distance between the projected map point on the image plane and the estimated point is less than a distance to a nearest neighbor object.

Aspect 32. The non-transitory computer-readable medium of Aspect 30, wherein the distance between the projected map point on the image plane and the estimated point is less than a maximum distance.

Aspect 33. The non-transitory computer-readable medium of any one of Aspects 29 to 32, wherein the instructions cause the at least one processor to associate the point information with the projected map point based on three dimensional coordinates of the map point.

Aspect 34. The non-transitory computer-readable medium of any one of Aspects 29 to 33, wherein the instructions further cause the at least one processor to: receive an estimated three-dimensional map of the environment; and associate the point information with the map point based on a comparison between the estimated three-dimensional map and the map of an environment.

Aspect 35. The non-transitory computer-readable medium of any one of Aspects 25 to 34, wherein the instructions further cause the at least one processor to: determine a distance to the object is greater than a threshold distance; and obtain the point information from the obtained image data based on the distance to the object being greater than the threshold distance.

Aspect 36. The non-transitory computer-readable medium of any one of Aspects 25 to 35, wherein the point information includes corner information describing three or more corners of the object in the obtained image data, and wherein the estimated point includes an estimated center point and estimated direction the object is facing.

Aspect 37. An apparatus comprising means for one or more means for performing operations according to any one or more of Aspects 1 to 36.

What is claimed is:

1. An apparatus for localization, comprising:
at least one memory comprising instructions; and
at least one processor coupled to the at least one memory and configured to:
obtain a map of an environment, the map including a map point representing an object in the environment;
obtain image data including the object in the environment, wherein the image data is associated with a camera pose;
generate point information from the obtained image data, the obtained point information describing two or more points of the object in the obtained image data, wherein the point information includes corner information describing corners of the object in the obtained image data;
associate the point information with the map point based, at least in part, on a comparison of the map point and an estimated point by projecting the map point to an image plane, wherein the estimated point includes an estimated center point that is estimated based on the camera pose, the map point, the corner information, and point information;
determine a location of the apparatus based on the associated point information and the map point; and
output the location of the apparatus.

2. The apparatus of claim 1, wherein the corner information describes three or more corners of the object in the obtained image data.

3. The apparatus of claim 1, wherein the map point comprises a centroid of the object in the environment.

4. The apparatus of claim 1, wherein the at least one processor is configured to associate the point information with the map point on an image plane.

5. The apparatus of claim 4, wherein the at least one processor is configured to associate the point information with the map point based on a distance between the projected map point on the image plane and the estimated point.

6. The apparatus of claim 5, wherein the distance between the projected map point on the image plane and the estimated point is less than a distance to a nearest neighbor object.

7. The apparatus of claim 5, wherein the distance between the projected map point on the image plane and the estimated point is less than a maximum distance.

8. The apparatus of claim 4, wherein the at least one processor is configured to associate the point information with the projected map point based on three dimensional coordinates of the map point.

9. The apparatus of claim 4, wherein the at least one processor is further configured to:
receive an estimated three-dimensional map of the environment; and
associate the point information with the map point based on a comparison between the estimated three-dimensional map and the map of an environment.

10. The apparatus of claim 1, wherein the at least one processor is further configured to:
determine whether a distance to the object is greater than a threshold distance; and
obtain the point information from the obtained image data based on a determination that the distance to the object is greater than the threshold distance.

11. The apparatus of claim 1, wherein the point information includes corner information describing three or more corners of the object in the obtained image data, and wherein the estimated point includes an estimated center point and estimated direction the object is facing.

12. A method for localization, comprising:
obtaining a map of an environment, the map including a map point representing an object in the environment;
obtaining image data including the object in the environment, wherein the image data is associated with a camera pose;
generating point information from the obtained image data, the obtained point information describing two or more points of the object in the obtained image data;
associating the point information with the map point based, at least in part, on a comparison of the map point and an estimated point by projecting the map point to an image plane, wherein the estimated point includes an estimated center point that is estimated based on the camera pose, the map point, the corner information, and point information;
determining a location based on the associated point information with the map point, associating the point and the map point; and
outputting the location.

13. The method of claim 12, wherein the corner information describes three or more corners of the object in the obtained image data.

14. The method of claim 12, wherein the map point comprises a centroid of the object in the environment.

15. The method of claim 12, wherein the point information is associated with the map point on an image plane.

16. The method of claim 15, wherein associating the point information with the map point is based on a distance between the projected map point on the image plane and the estimated point.

17. The method of claim 16, wherein the distance between the projected map point on the image plane and the estimated point is less than a distance to a nearest neighbor object.

18. The method of claim 16, wherein the distance between the projected map point on the image plane and the estimated point is less than a maximum distance.

19. The method of claim 15, wherein associating the point information with the projected map point is based on three dimensional coordinates of the map point.

20. The method of claim 15, further comprising:
receiving an estimated three-dimensional map of the environment; and
associating the point information with the map point based on a comparison between the estimated three-dimensional map and the map of an environment.

21. The method of claim 12, further comprising:
determining a distance to the object is greater than a threshold distance; and
obtaining the point information from the obtained image data based on the distance to the object being greater than the threshold distance.

22. The method of claim 12, wherein the point information includes corner information describing three or more corners of the object in the obtained image data, and wherein the estimated point includes an estimated center point and estimated direction the object is facing.

23. A non-transitory computer-readable medium having stored thereon instructions that, when executed by at least one processor, cause the at least one processor to:
obtain a map of an environment, the map including a map point representing an object in the environment;
obtain image data including the object in the environment, wherein the image data is associated with a camera pose;
generate point information from the obtained image data, the obtained point information describing two or more points of the object in the obtained image data, wherein the point information includes corner information describing corners of the object in the obtained image data;
associate the point information with the map point based, at least in part, on a comparison of the map point and an estimated point by projecting the map point to an image plane, wherein the estimated point includes an estimated center point that is estimated based on the camera pose, the map point, the corner information, and point information;
determine a location of the apparatus based on the associated point information and the map point; and
output the location of the apparatus.

24. The non-transitory computer-readable medium of claim 22, wherein the corner information describes three or more corners of the object in the obtained image data.

25. An apparatus comprising:
means for obtaining a map of an environment, the map including a map point representing an object in the environment;
means for obtaining image data including the object in the environment, wherein the image data is associated with a camera pose;
means for generating point information from the obtained image data, the obtained point information describing two or more points of the object in the obtained image data;
means for associating the point information with the map point based, at least in part, on a comparison of the map point and an estimated point by projecting the map point to an image plane, wherein the estimated point includes an estimated center point that is estimated based on the camera pose, the map point, the corner information, and point information;
means for determining a location based on the associated point information with the map point, associating the point and the map point; and
means for outputting the location.

26. The apparatus of claim 24, wherein the corner information describes three or more corners of the object in the obtained image data.

* * * * *